(12) United States Patent
  Dougherty

(10) Patent No.: US 9,991,693 B2
(45) Date of Patent: Jun. 5, 2018

(54) CIRCUIT PROTECTION DEVICE AND METHODS OF CONFIGURING A CIRCUIT PROTECTION DEVICE

(71) Applicant: General Electric Company, Schenectady, NY (US)

(72) Inventor: John James Dougherty, Newtown, PA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 468 days.

(21) Appl. No.: 14/713,725

(22) Filed: May 15, 2015

(65) Prior Publication Data

US 2015/0263503 A1    Sep. 17, 2015

Related U.S. Application Data

(63) Continuation-in-part of application No. 13/653,901, filed on Oct. 17, 2012, now Pat. No. 9,054,513.

(51) Int. Cl.
  *H02H 3/093*     (2006.01)
  *H02H 3/00*      (2006.01)

(52) U.S. Cl.
  CPC ................................. *H02H 3/006* (2013.01)

(58) Field of Classification Search
  USPC ........................................... 361/115, 86, 93.3
  See application file for complete search history.

(56) References Cited

U.S. PATENT DOCUMENTS

| 4,722,059 A * | 1/1988 | Engel ................... H02H 3/0935 361/94 |
| 4,809,125 A * | 2/1989 | Matsko ................. H02H 3/006 361/93.3 |
| 4,967,304 A * | 10/1990 | Dougherty .......... H02H 3/0935 361/31 |
| 5,089,928 A * | 2/1992 | Durivage, III ........... H02H 1/06 340/664 |

(Continued)

FOREIGN PATENT DOCUMENTS

| CN | 1322978 A | 11/2001 |
| CN | 103135728 A | 6/2013 |
| EP | 2068413 A2 | 6/2009 |

OTHER PUBLICATIONS

Unofficial English Translation of Chinese Office Action and Search Report issued in connection with corresponding CN Application No. 201410039205.0 dated Apr. 6, 2017.

(Continued)

*Primary Examiner* — Ronald W Leja
(74) *Attorney, Agent, or Firm* — GE Global Patent Operation; Stephen G. Midgley

(57) ABSTRACT

A circuit protection device having operational parameters configurable only via a separate programming device includes a memory configured to receive a selector identifying one of a plurality of operational parameters to be adjusted, and to receive a parameter value from the programming device. A processor is coupled to the memory and is configured to receive the selector from the memory, select the operational parameter of the circuit protection device based on the selector, and to receive a parameter value for the operational parameter from memory, and set the selected operational parameter to the parameter value.

16 Claims, 3 Drawing Sheets

(56) References Cited

U.S. PATENT DOCUMENTS

| | | | |
|---|---|---|---|
| 5,270,898 A | 12/1993 | Elms et al. | |
| 5,490,086 A | 2/1996 | Leone et al. | |
| 5,943,201 A | 8/1999 | Walker et al. | |
| 6,005,757 A * | 12/1999 | Shvach | H02H 3/006 361/64 |
| 6,078,489 A | 6/2000 | Messerli et al. | |
| 6,195,243 B1 | 2/2001 | Spencer et al. | |
| 6,212,049 B1 | 4/2001 | Spencer et al. | |
| 6,239,960 B1 * | 5/2001 | Martin | H02H 3/07 361/115 |
| 6,262,872 B1 | 7/2001 | Messerli et al. | |
| 6,289,267 B1 * | 9/2001 | Alexander | H02H 3/00 700/286 |
| 6,347,027 B1 * | 2/2002 | Nelson | H02H 1/0092 361/64 |
| 6,356,426 B1 * | 3/2002 | Dougherty | H02H 3/006 361/102 |
| 6,546,342 B1 | 4/2003 | Dougherty et al. | |
| 6,985,784 B2 | 1/2006 | Vandevanter et al. | |
| 7,869,170 B2 | 1/2011 | Colsch et al. | |
| 7,936,547 B2 | 5/2011 | Dougherty et al. | |
| 9,054,513 B2 * | 6/2015 | Dougherty | H02H 3/0935 |
| 2003/0193767 A1 | 10/2003 | Vicente et al. | |
| 2005/0047045 A1 | 3/2005 | Puskar et al. | |
| 2012/0092802 A1 | 4/2012 | Weiher | |
| 2013/0222966 A1 * | 8/2013 | Shah | H01H 9/167 361/170 |
| 2014/0104736 A1 * | 4/2014 | Dougherty | H02H 3/0935 361/86 |
| 2015/0263503 A1 * | 9/2015 | Dougherty | H02H 3/006 361/93.2 |

OTHER PUBLICATIONS

Schmidt, "Electronic Motor Circuit Protectors", 55th IEEE Petroleum and Chemical Industry Technical Conference, Cincinnati, pp. 1-6, Sep. 22-24, 2008.

Lagree, "Un-powered Thermal Memory Protection for Circuit Breakers", Annual Pulp and Paper Industry Technical Conference, San Antonio, pp. 1-6, Jun. 21-23, 2010.

EP Search Report and Written Opinion issued in connection with corresponding EP Application No. 14150813.5 dated May 26, 2014.

U.S. Non-Final Office Action issued in connection with corresponding U.S. Appl. No. 13/653,901 dated Jun. 20, 2014.

U.S. Final Office Action issued in connection with corresponding U.S. Appl. No. 13/653,901 dated Nov. 17, 2014.

* cited by examiner

CIRCUIT PROTECTION DEVICE AND METHODS OF CONFIGURING A CIRCUIT PROTECTION DEVICE

CROSS REFERENCE TO RELATED APPLICATIONS

This application is a Continuation-In-Part application of U.S. application Ser. No. 13/653,901, filed Oct. 17, 2012, the contents of which are incorporated herein by reference in their entirety.

BACKGROUND OF THE INVENTION

The present application relates generally to power distribution systems and, more particularly, to a circuit protection device and methods of configuring a circuit protection device.

Known electrical distribution systems include one or more circuit breakers that that are each coupled to one or more loads. The circuit breakers typically include a trip unit that controls the circuit breakers based upon sensed current flowing through the circuit breakers. For example, the trip unit causes current flowing through the circuit breaker to be interrupted if the current is outside of acceptable operating conditions.

At least some known trip units are programmed with one or more current thresholds (also known as "pickup" thresholds) that identify undesired current levels for the circuit breaker. In addition, different current thresholds may be desired by customers for a particular circuit breaker design. Accordingly, some known circuit breakers include one or more adjustable components that each are associated with a separate circuit breaker setting, such as a pickup threshold. A user or a manufacturer, for example, can adjust each circuit breaker setting by adjusting the component. However, each adjustable component is typically associated with a single circuit breaker setting. Accordingly, configuration options for at least some known circuit breakers may undesirably be limited, for example, by a lack of available space to add multiple adjustable components. For example, in many known circuit breakers, there is insufficient space to add any adjustable components, such as knobs, dials, or keypads. In other instances, circuit breakers without adjustable components need to have operating parameters configured or adjusted during assembly. It would be desirable therefor to provide a circuit breaker having operating parameters and settings that are operatively adjustable only via a separate programming device.

BRIEF DESCRIPTION OF THE INVENTION

In one aspect, a circuit protection device is provided having operational parameters configurable only via a separate programming device. The circuit protection device includes a memory configured to store a selector identifying one of a plurality of operational parameters to be adjusted from the programming device, and configured to store an operational parameter value received from the programming device. A processor is coupled to said memory and is configured to receive the selector from memory, select the identified operational parameter of said circuit protection device based on the selector, and receive the parameter value for the selected operational parameter from memory; and set the operational parameter identified by the selector received to the parameter value received.

In another aspect, a circuit protection system is provided. The system includes a programming device and circuit breaker arranged to be communicatively coupled wherein the circuit breaker has operational parameters configurable only via the separate programming device. The circuit breaker includes a memory configured to store a selector identifying one of a plurality of operational parameters to be adjusted received from the programming device, and is configured to store an operational parameter value received from the programming device. A processor is coupled to the memory. The processor is configured to receive the selector from memory, select the identified operational parameter of the circuit protection device based on the selector, receive the parameter value for the selected operational parameter from memory; and set the operational parameter identified by the selector received to the parameter value received.

DETAILED DESCRIPTION OF THE INVENTION

Exemplary embodiments of a circuit protection device and methods of configuring the circuit protection device are described herein. In an exemplary embodiment, the circuit protection device operating parameter settings are adjustable only via a separate programming device, such as a remote device, that is configured to communicate with the circuit protection device. The circuit protection device includes a controller that includes a memory and a selector stored in the memory. The selector is used to determine which operational parameter of the circuit protection device is adjusted by the programming device. The selector may be overwritten or replaced within the memory to cause a different operational parameter to be controlled by the programming device. The operational parameter controlled by the programming device is set to a parameter value based on information, such as a predetermined voltage or binary signal, provided by the programming device. Accordingly, the programming device is able to be associated with a selectable operational parameter of the circuit protection device to enable a variety of product configurations to be implemented for the circuit protection device.

Figure 1:
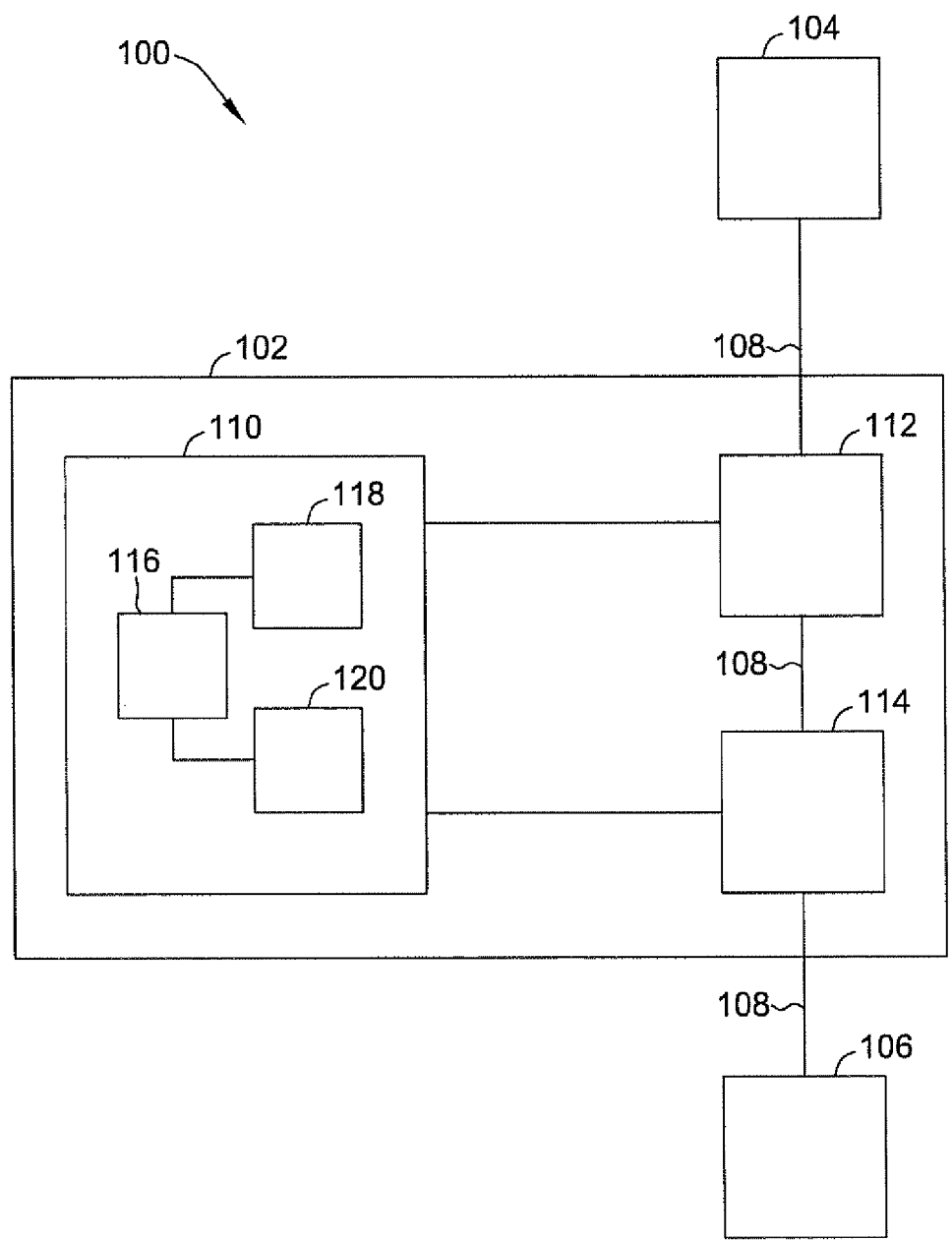
FIG. 1 is a block diagram of an exemplary power distribution system.

FIG. 1 is a schematic block diagram of a portion of an exemplary power distribution system 100 illustrating a circuit protection device 102, an electrical power source 104, and a load 106. While a single circuit protection device 102, a single electrical power source 104, and a single load 106 are illustrated within FIG. 1, it should be recognized that any suitable number of circuit protection devices 102, electrical power sources 104, and loads 106 may be included within power distribution system 100.

Electrical power source 104 may include, for example, one or more generators or other devices that provide electrical current (and resulting electrical power) to load 106. In an exemplary embodiment, the electrical current is transmitted to load 106 through one or more electrical distribution lines or busses 108 coupled to circuit protection device 102. Load 106 may include, but is not limited to machinery, motors, lighting, and/or other electrical and mechanical equipment of a manufacturing or power generation or distribution facility.

Circuit protection device 102 is configured to program a control a delivery of power from electrical power source 104 to load 106. In an exemplary embodiment, circuit protection device 102 is a circuit breaker without operational parameter adjustment components, that is, having operational parameters configurable only via a separate programming device. Alternatively, circuit protection device 102 may be any other device without operating parameter adjustment components and requiring a separate programming device to adjust operating parameters and that enables power distribution system 100 to function as described herein. In an exemplary embodiment, circuit protection device 102 includes a controller 110 (sometimes referred to as a "trip unit") operatively coupled to a sensor 112 and a trip mechanism 114. Controller 110, in an exemplary embodiment, includes a processor 116 coupled to a memory 118. In one embodiment, a display device 120 is also coupled to processor 116.

Sensor 112, in an exemplary embodiment, is a current sensor, such as a current transformer, a Rogowski coil, a Hall-effect sensor, and/or a shunt that measures a current flowing through trip mechanism 114. Alternatively, sensor 112 may include any other sensor that enables power distribution system 100 to function as described herein. In an exemplary embodiment, each sensor 112 generates a signal representative of the measured or detected current (hereinafter referred to as a "current signal") flowing through an associated trip mechanism 114. In addition, sensor 112 transmits the current signal to processor 116. Processor 116 is programmed to activate trip mechanism 114 to interrupt a current provided to a load 106 if the current signal, and/or the current represented by the current signal, exceeds a programmable current or current-time threshold.

Trip mechanism 114 includes, for example, one or more circuit breaker devices and/or arc containment devices. Exemplary circuit breaker devices include, for example, circuit switches, contact arms, and/or circuit interrupters that interrupt current flowing through trip mechanism 114 to a load 106 coupled to trip mechanism 114. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Processor 116 controls the operation of circuit protection device 102 and gathers measured operating condition data, such as data representative of a current measurement (also referred to herein as "current data"), from a sensor 112 associated with a trip mechanism 114 coupled to processor 116. Processor 116 stores the current data in a memory 118 coupled to processor 116.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 stores data and/or instructions that are usable by processor 116 to control circuit protection device 102. In an exemplary embodiment, memory 118 includes non-volatile memory, such as flash memory and/or Electrically Erasable Programmable Read Only Memory (EEPROM). Additionally or alternatively, memo 118 may include magnetic RAM (IMAM), ferroelectric RAM (FeRAM), read only memory (ROM), and/or any other type of memory that enables circuit protection device 102 to function as described herein.

In one embodiment, display device 120 includes one or more light-emitting diodes (LEDs) that indicate a status of circuit protection device 102 and/or trip mechanism 114. For example, processor 116 may activate one or more components (e.g., LEDs) of display device 120 to indicate that circuit protection device 102 and/or trip mechanism 114 is active and/or operating normally, that a fault or failure has occurred, and/or any other status of trip mechanism 114 and/or circuit protection device 102. Additionally or alternatively, display device 120 may display an indication (using one or more LEDs, for example) of an operational parameter of circuit protection device 102 that programming device 206 is configured to control, as described more fully herein. In one embodiment, display device 120 is replaced by one or more printed stickers or labels that identify the operational parameter or parameters of circuit protection device 102 that one or more programming devices 206 are configured to control.

Figure 2:
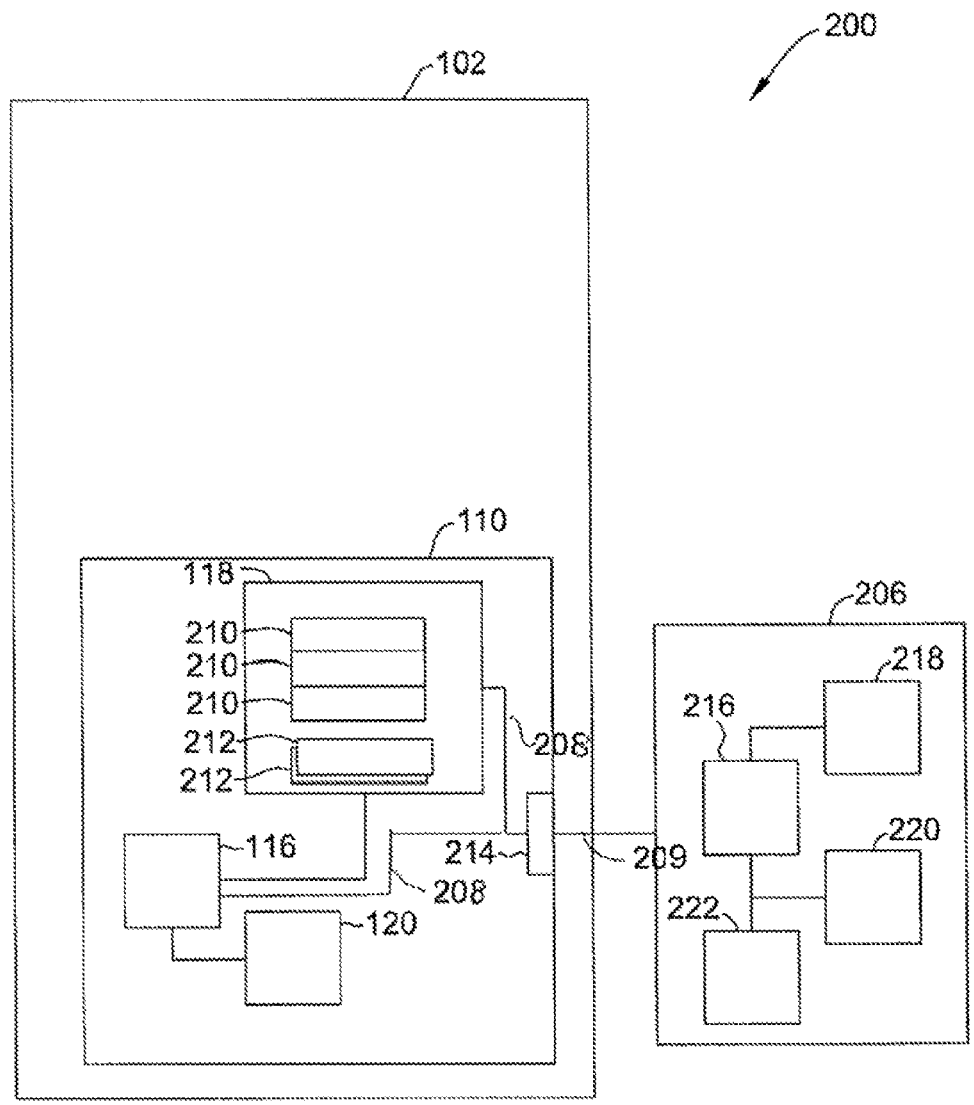
FIG. 2 is a block diagram of an exemplary configuration system that may be used with the power distribution system shown in FIG. 1.

FIG. 2 is a block diagram of an exemplary configuration system 200 that may be used with power distribution system 100 (shown in FIG. 1). In an exemplary embodiment, configuration system 200 includes a controller 110. In some embodiments, at least one analog to digital converter (ADC) (not shown) is coupled to controller 110 and may be included within circuit protection device 102 or, in other embodiments, within programming device 206. In addition, configuration system 200 includes a separate programming device 206 that is configured to be communicatively coupled to controller 110.

In an exemplary embodiment, the programming device 206 is adjustable, for example by a user. to provide a binary signal to memory 118. In an exemplary embodiment, a user operates programming device 206 to selectably control the binary output signal provided to processor 116. In an embodiment, programming device 206 enables a user to independently control a binary signal to be provided from the programming device 206 to processor 116 through a communication line 209.

In another embodiment, the programming device 206 is adjustable, for example by a user, to provide a selectable voltage to an ADC (not shown). The ADC (not shown) receives a selected voltage from programming device 206 and converts the voltage to a digital output (herein referred to as a "voltage value"). The voltage value is transmitted to processor 116 through a bus 208. In an exemplary embodiment, bus 208 is an 8 bit bus. Alternatively, bus 208 may have any width that enables configuration system 200 to function as described herein. In an alternative embodiment, ADC (not shown) is not included. Rather, programming device 206 provides an input to the controller that represents a binary or a binary coded decimal (BCD) or digital signal that is transmitted directly to processor 116 through bus 208 in place of a voltage value.

In an exemplary embodiment, memory 118 stores a value 210 of one or more operational parameters (referred to herein as "parameter values") of circuit protection device 102. The operational parameters may include, without limitation, a long time pickup threshold, a short time pickup threshold, an instantaneous pickup threshold, one or more time bands for a pickup threshold, and/or one or more trip curve characteristics for circuit protection device 102. In an exemplary embodiment, parameter values 210 stored in memory 118 are default, or preprogrammed, values of the operational parameters.

In an exemplary embodiment, one or more selectors 212 are also stored within memory 118. Selector 212 is a code, an instruction, a value, and/or another suitable indicator that identifies which operational parameter is controlled by programming device 206. In an embodiment, the operational parameter controlled by programming device 206 receives a value based on, or using, the voltage value or digital signal received from programming device 206, rather than from a parameter value 210 stored within memory 118. In contrast, the non-adjustable operational parameters of circuit protection device 102 (i.e., parameters that are not controlled by programming device 206) receive values from associated parameter values 210 stored in memory 118. Selector 212 may be changed, or reprogrammed, such that a different operational parameter is controlled by programming device 206. If an operational parameter is no longer controlled by programming device 206, the operational parameter receives a value from an associated parameter value 210 in memory 118.

Processor 116 receives the voltage value or binary signal and sets a value for the operational parameter selected or identified by selector 212 using the voltage value or binary signal. More specifically, in an exemplary embodiment, processor 116 converts the voltage value to a percentage of the maximum voltage value receivable from ADC (not shown). For example, in an embodiment in which bus 208 is an 8 bit bus, the maximum voltage value is 255. Processor 116 references a table or another data structure to determine a conversion factor for the voltage value using the selected operational parameter. Processor 116 multiplies the percentage by the conversion factor to calculate the value for the selected operational parameter, and sets the selected operational parameter to the calculated value.

In an exemplary embodiment, controller 110 includes a programming port 214 coupled to memory 118. Programming port 214 may be externally accessible by a customer or another user after assembly of circuit protection device 102, for example, or may only be accessible during manufacturing and/or assembly of circuit protection device 102 (or at another stage in which a cover (not shown) of circuit protection device 102 is removed). Programming port 214 receives data from programming device 206, for example via communication line 209, or other suitable conductor and stores and/or updates data in memory 118 with the data received. In other embodiments, programming device 206 may provide the output signal wirelessly, such as through radio-frequency, fiber-optic, or any other suitable wired or wireless communication type. Once received, parameter values 210 and/or selector 212 are stored and/or updated in memory 118 using data received from programming device 206 through programming port 214.

In an exemplary embodiment, programming device 206 includes a processor 216, a memory 218, a display device 220, and/or a user input device 222. Processor 216 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory 218 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory 218 includes data and/or instructions that are usable by processor 216 to enable processor 216 to perform the functions described herein.

Display device 220 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying data and/or text to a user. User input device 222 includes, without limitation, a keyboard, a keypad, a touch-sensitive screen, a mouse, a scroll wheel, a pointing device, an audio input device employing speech-recognition software, and/or any suitable device that enables a user to input data into programming device 206.

During operation, a user, such as a manufacturer, operates user input device 222 to input data to be transmitted to controller 110. Alternatively, the user may operate user input device 222 to select preloaded data within memory 218 to be transmitted to controller 110. In an exemplary embodiment, processor 216 causes the data to be transmitted to controller 110 through programming port 214. The data is stored within memory 118 of controller 110, thus replacing one or more parameter values 210 and/or selector 212 within memory 118. Processor 116 of controller 110 uses the new parameter values 210 and/or selector 212 during operation of circuit protection device 102. In an exemplary embodiment, programming device 206 generates a label or a sticker, for example, that may be affixed to circuit protection device 102 to identify the parameter that is controlled by programming device 206.

In an embodiment, a programming device 206 controls a plurality of operational parameters such that a voltage value, or a binary signal, received from programming device 206 is used to set parameter values 210 associated with each of the operational parameters. Parameter values 210 may each be set to the same value based on the voltage or binary signal value, or parameter values 210 may be set to values that are ratios of each other, or that are proportional to each other, based on the voltage value. For example, a first pickup threshold, such as a long time pickup threshold, may be set to a value between about 0.4 times a current rating of circuit protection device 102 and about equal to the current rating of circuit protection device 102. A second pickup threshold, such as a short time pickup threshold, may be set to a value proportional to the first pickup threshold value, such as a value between about 2.4 times the current rating of circuit protection device 102 and about 6 times the current rating of circuit protection device 102.

It should be recognized that replacement parameter values 210 and/or selector 212 may be stored in memory 118 at a customer site, at a manufacturing site, and/or at any other suitable location. Accordingly, a manufacturer or another entity may provide circuit protection device 102 in a variety of configurations or stocking control units (SKUs), and/or may reprogram circuit protection device 102 as desired to satisfy various customer requirements.

Figure 3:
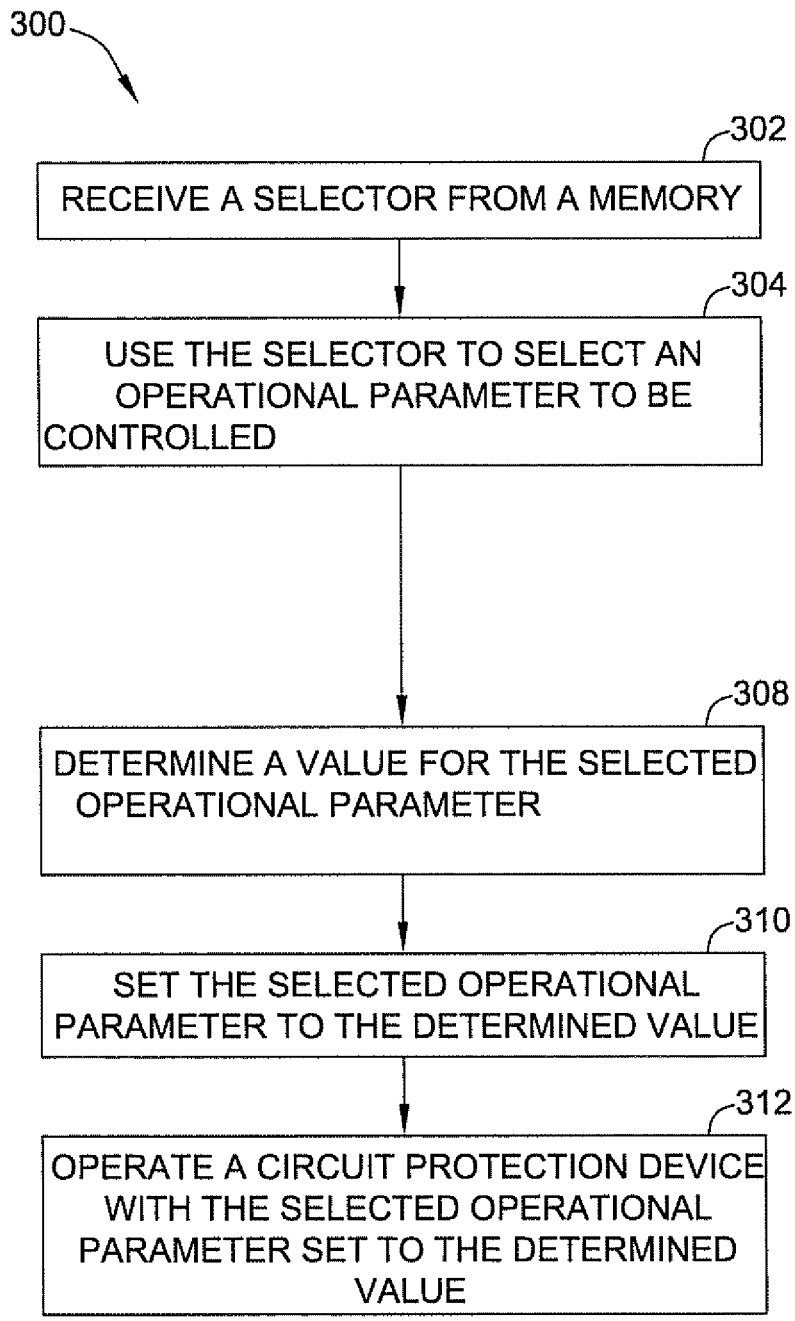
FIG. 3 is a flow diagram of an exemplary method of configuring a circuit protection device, such as the circuit protection device shown in FIG. 1.

FIG. 3 is a flow diagram of an exemplary method 300 of configuring a circuit protection device, such as circuit protection device 102 (shown in FIG. 1). In an exemplary embodiment, method 300 is executed by controller 110 of circuit protection device 102.

Method 300 includes receiving 302 a selector 212 (shown in FIG. 2) from memory 118. For example, selector 212 may be stored within memory 118 by programming device 206 (shown in FIG. 2) and/or by any other device. In one embodiment, a first selector may be stored within memory 118 during an initial configuration process, for example. The first selector may be overwritten by a second selector received at a later time from a device external to circuit protection device 102, such as from programming device 206. The second selector is received through programming port 214, for example, and replaces the first selector. In such an embodiment, processor 116 receives 302 the second selector from memory 118. In addition, operational parameter values may be received from programming device 206 (or another device) and may be stored within memory 118 as parameter values 210 (shown in FIG. 2). If pre-existing parameter values 210 are stored within memory 118, the pre-existing parameter values 210 are replaced by the values received from programming device 206.

In an exemplary embodiment, processor 116 uses 304 selector 212 to select an operational parameter to be controlled by programming device 206 (shown in FIG. 2). In one embodiment, the operational parameter is one of a plurality of operational parameters of circuit protection device 102. In such an embodiment, if selector 212 is replaced by a second, or later, selector as described above, processor 116 selects a different operational parameter that is associated with, or that corresponds to, the second selector.

A user may operate programming device 206 to adjust a voltage output or binary signal output of programming device 206. In the embodiment wherein the voltage output is provided to an ADC (not shown), it is converted (shown in FIG. 2) to a digital voltage value. For other embodiments, wherein a binary signal output is provided by the programming device 206 instead of a voltage signal output, the ADC is unnecessary and may be omitted. Processor 116 receives 306 the output binary signal or voltage value from programming device 206 (for example, through bus 208), and determines 308 a value for the selected operational parameter based on the output from programming device 206. Processor 116 sets 310 the selected operational parameter to the determined value. If the selected operational parameter had previously been set to a different value, processor 116 changes, or sets, the operational parameter to the determined value upon the determination that selector 212 is associated with the operational parameter.

Circuit protection device 102 operates 312 with the selected operational parameter set to the determined value. In one embodiment, controller 110 causes display device 120 to display an indication that the selected operational parameter is controlled by adjustment device 204 (i.e., that the selected operational parameter is set to a parameter value using the voltage value received from adjustment device 204).

A technical effect of the methods and systems described herein may include one or more of: (a) receiving a selector from a memory; (b) selecting an operational parameter of a circuit protection device using a selector; (c) receiving a signal representative of a selected voltage provided by a separate programming; device; and (d) setting a selected operational parameter to a parameter value using a received signal.

Exemplary embodiments of a circuit protection device and methods of configuring a circuit protection device are described above in detail. The circuit protection device and methods are not limited to the specific embodiments described herein but, rather, components of the circuit protection device and/or operations of the methods may be utilized independently and separately from other components and/or operations described herein. Further, the described components and/or operations may also be defined in, or used in combination with, other systems, methods, and/or devices, and are not limited to practice with only the power distribution system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device having operational parameters configurable only via a separate programming device, the circuit protection device comprising:
   a memory configured to store a selector received from the programming device;
   said memory further configured to store an operational parameter value received from the programming device; and
   a processor coupled to said memory, said processor configured to: receive the selector from said memory, the selector identifying one of a plurality of operational parameters to be adjusted;
   receive a voltage value representative of a selected voltage provided by the programming device;
   select the identified operational parameter of said circuit protection device based on the selector;
   receive the parameter value for the selected operational parameter from memory; and
   set the operational parameter identified by the selector received from said memory to the parameter value received from memory based on the voltage value received from the programming device.

2. A circuit protection device in accordance with claim 1, wherein the selector is a first selector, said circuit protection device configured to receive a second selector from the separate programming device, and replace the first selector within said memory with the second selector.

3. A circuit protection device in accordance with claim 1, wherein the parameter value is a first parameter value, said circuit protection device further configured to receive a second parameter value from the programming device external to said circuit protection device and replace the first parameter value within said memory with the second parameter value.

4. A circuit protection device in accordance with claim 2, wherein the identified operational parameter is a first operational parameter of the plurality of operational parameters of said circuit protection device, said processor is configured to receive the second selector from said memory and to select a second operational parameter of the plurality of operational parameters based on the second selector.

5. A circuit protection device in accordance with claim 4, wherein said processor is configured to set the second operational parameter to the second parameter value.

6. A circuit protection device in accordance with claim 1, wherein said processor is configured to select the identified operational parameter to be one of a pickup threshold of said circuit protection device, a time band for the pickup threshold, and a trip curve characteristic for said circuit protection device.

7. A circuit protection device in accordance with claim 1, further comprising a programming port for receiving at least one of the selector and the parameter value from the programming device external to said circuit protection device.

8. A circuit protection device in accordance with claim 1, wherein said processor is configured to set a plurality of pickup thresholds based on the identified operational parameter, wherein a first pickup threshold of the plurality of pickup thresholds is set to a value that is proportional to a value of a second pickup threshold of the plurality of pickup thresholds.

9. A circuit protection system comprising:
a programming device;
a circuit protection device having operational parameters configurable only via said programming device;
said programming device configured to be communicatively coupled to said circuit protection device;
said circuit protection device comprising:
 a memory configured to store a selector received from said programming device;
 said memory further configured to store an operational parameter value received from said programming device; and
 a processor coupled to said memory, said processor configured to:
  receive the selector from said memory, the selector identifying one of a plurality of operational parameters to be adjusted;
  receive a voltage value representative of a selected voltage provided by the programming device;
  select the identified operational parameter of said circuit protection device based on the selector;
  receive the parameter value for the selected operational parameter from memory; and
  set the operational parameter identified by the selector received from said memory to the parameter value received from memory based on the voltage value received from the programming device.

10. A circuit protection system in accordance with claim 9, wherein the selector is a first selector, said circuit protection device configured to receive a second selector from said separate programming device, and replace the first selector within said memory with the second selector.

11. A circuit protection system in accordance with claim 9, wherein the parameter value is a first parameter value, said circuit protection device further configured to receive a second parameter value from said programming device external to said circuit protection device and replace the first parameter value within said memory with the second parameter value.

12. A circuit protection system in accordance with claim 10, wherein the identified operational parameter is a first operational parameter of the plurality of operational parameters of said circuit protection device, said processor is configured to receive the second selector from said memory and to select a second operational parameter of the plurality of operational parameters based on the second selector.

13. A circuit protection system in accordance with claim 12, wherein said processor is configured to set the second operational parameter to the second parameter value.

14. A circuit protection system in accordance with claim 9, wherein said processor is configured to select the identified operational parameter to be one of a pickup threshold of said circuit protection device, a time band for the pickup threshold, and a trip curve characteristic for said circuit protection device.

15. A circuit protection system in accordance with claim 9, further comprising a programming port for receiving at least one of the selector and the parameter value from said programming device external to said circuit protection device.

16. A circuit protection system in accordance with claim 9, wherein said processor is configured to set a plurality of pickup thresholds based on the identified operational parameter, wherein a first pickup threshold of the plurality of pickup thresholds is set to a value that is proportional to a value of a second pickup threshold of the plurality of pickup thresholds.

* * * * *